US005267382A

United States Patent [19]

Aulson et al.

[11] Patent Number: 5,267,382

[45] Date of Patent: Dec. 7, 1993

[54] SCALING NEEDLE GUN SHROUD

[76] Inventors: Alan P. Aulson, 203 Pond St., Georgetown, Mass. 01833; Thomas P. Higgins, 25 Perkins St., Peabody, Mass. 01960; Loran E. Sullivan, Pillsbury St., Georgetown, Mass. 01833

[21] Appl. No.: 939,905

[22] Filed: Sep. 4, 1992

[51] Int. Cl.[5] .............................................. B23D 79/00

[52] U.S. Cl. .................................. 29/81.14; 29/81.13

[58] Field of Search ................. 29/81.12, 81.13, 81.14, 29/81.15, 81.16, 81.17, DIG. 7, DIG. 34, DIG. 56, DIG. 94, DIG. 98

[56] References Cited

U.S. PATENT DOCUMENTS

| | | | |
|---|---|---|---|
| 3,193,908 | 7/1965 | White | 29/81 |
| 3,343,246 | 1/1967 | Kelley et al. | 29/81 |
| 3,880,047 | 6/1975 | Dosier | 90/12 D |
| 4,037,982 | 10/1977 | Clement | 408/61 |
| 4,134,193 | 3/1979 | Lenzin et al. | 29/81 L |
| 4,594,759 | 6/1986 | Ikeda | 29/81.16 |
| 4,940,289 | 7/1990 | Trovato et al. | 29/81.14 X |
| 5,010,632 | 4/1991 | Gardner | 29/81.14 |

FOREIGN PATENT DOCUMENTS

| | | | |
|---|---|---|---|
| 1155719 | 5/1958 | France | 29/81.16 |

*Primary Examiner*—Mark Rosenbaum
*Assistant Examiner*—S. Thomas Hughes
*Attorney, Agent, or Firm*—Don Halgren

[57] ABSTRACT

A needle scaling device for environmentally safe removal of material such as lead paint or the like, from difficult to clean surfaces, such as bridges. The needle scaling device includes a plurality of reciprocably movable needles which strike the surface being treated, to chip away the paint. A cowling is disposed about the distal end of the device to enshroud the needles. The cowling has an annular array of bristles disposed on its distal end, to provide a flexible shroud and hence a containment plenum around the needles.

13 Claims, 1 Drawing Sheet

SCALING NEEDLE GUN SHROUD

BACKGROUND OF THE INVENTION (1) Field of the Invention

This invention relates to needle scaling devices and more particularly to protective shrouds for such needle scaling devices.

(2) Prior Art

Needle scaling guns are surface cleaning tools. They are utilized to chip paint, plaster, or surface layers off of bridges, buildings, walls, machines and the like. The needle scaling guns are comprised of a plurality of longitudinally, reciprocably movable steel needles clustered at the distal end of a housing of a pneumatically powered gun.

A portable scaling gun is shown in U.S. Pat. No. 4,134,193 to Lenzin et al, wherein a bundle of pins are held in parallel relationship and extend out the end of a housing barrel. The barrel has a handgrip through which empowering compressed air is supplied to the gun.

U.S. Pat. No. 3,193,908 to White shows a needle scaler with a plurality of needles mounted on an anvil which is telescopically receivable in a bore which permits its reciprocable movement from a gun housing.

U.S. Pat. No. to Kelly et al 3,343,246 shows a manually operable scaling tool having a plurality of needles reciprocably movable, by an electric motor, with respect to a cylindrical housing.

Each of these devices permits the tool operator to scale surfaces having various contours or shapes. Often, these scaling tools are utilized to remove lead paint from corners, both inside corners and outside corners, or crevaces and crannies.

When scaling devices are utilized for removal of such hazardous material such as lead paint or the like, they are utilized with a vacuum cowling around the distal end of the housing, to suction debris chipped away from the treated surface. Nonetheless, environmental needs and requirements, particularly for outside areas being scaled, bridges and the like, necessitate enclosure to minimize any contamination of the air or water around us.

It is an object of the present invention, to provide an improved portable needle scaling device over that shown in the prior art.

It is a further object of the present invention, to provide a portable needle scaling device which is adaptable to scale any given contour of a surface being scaled, while protecting the environment.

It is yet a further object of the present invention, to provide a portable needle scaling device which is able to protect the environment, and which also may be adapted, "in the field" to conform to angled surfaces, depending upon the angle of attack of the tool operator.

BRIEF SUMMARY OF THE INVENTION

The present invention comprises a needle scaling device having an elongated main housing, controlled and empowered through a grip handle at its proximal end, having a plurality of reciprocably movable needles extending from its distalmost end. An annular cowling adjacent the distal end of the elongated main housing, is in fluid communication, with a suction source, through a vacuum conduit. An annular array of relatively flexible bristles is disposed on the distal end of the housing, co-axial and co-terminous with the distal portion of the reciprocably movable needles.

When the scaling needles are in chipping contact with a surface being de-leaded, such as a bridge column or the like, the annular array of the bristles are also in contact with that surface being scaled. The bristles are secured at one end (their proximalmost end) to an annular clip. The annular clip is secured to the distal end of an annular cowling. The annular cowling forms a chamber around the bundle of reciprocable needles, to collect the debris shipped from the surface being scaled, and sucked out the vacuum conduit. The annular cowling and discharge port connect to the vacuum conduit are themselves reciprocably disposed about the distal end of the main housing, to permit the tool operator to move the bristle arrangement relative to the distal end of the needles. This allows the needles to be directed into say, a corner, while pulling the bristles and distal annular lip of the cowling proximally, enabling scaling to be effectuated in difficult, narrow or tight areas, while still allowing an environmental enclosure to be maintained to the most appropriate degree.

The annular array of bristles may also be trimmable, at an angle with respect to the longitudinal axis of the scaling needles and main housing, if the angle of attach of such needles with respect to the surface being scaled/stripped necessitated such adaptation.

The invention thus comprises a portable needle scaling device adaptable to clean surface portions of contaminants on structures in difficult to reach places, while permitting enclosure of such contaminants away from the environment, comprising: an elongated, tubularly shaped main housing having a proximal and a distal end; a plurality of longitudinally directed needle members extending reciprocably out of the distal end of the main housing, an empowerment means actuatably arranged within the housing adapted to effectuate reciprocable motion of the needles with respect to the housing; a power supply conduit in communication with the housing to provide power to the empowerment means; a trigger for actuating the empowerment means; a flexible shroud adapted around the distal end of the main housing, to define a plenum chamber between the shroud and the needles; and a vacuum conduit in fluid communication with plenum chamber to permit removal of debris entrained in the chamber when the needles energizedly act upon a surface being treated, to contain the debris generated by the needles and prevent them from escaping into the environment while permitting the needles to attack the surface from any convenient angle. The flexible shroud has a cowling attached thereto, the cowling comprising a tubular member having a proximal end that is arranged in a close fitting arrangement about the distal end of said main housing. The cowling has a distal end which is of a larger diameter then the proximal end of the cowling. The flexible shroud is attached to the distalmost end of the cowling. The flexible shroud comprises an annular array of flexible bristles. The flexible bristles are disposed in a co-axial manner with respect to the needles and the main housing. The cowling has a tightenable securement means arranged around its proximalmost end. The cowling is slidably movable along the distal end of the main housing, so as to permit the bristles to be moved with respect to the distal end of the needles.

The invention further comprises an elongated generally tubularly shaped main housing having an arrangement of reciprocably empowered needles extending from a distal end thereof; an actuatable empowerment source for reciprocatably moving the needles; a flexible shroud disposed about the distal end of the main housing and the needles, for enclosed and containing debris cleaned from a surface being treated by the needles. The tapered cowling is disposed about the distal end of the housing, the flexible shroud being attached to the distal end of the cowling; and a securement means is arranged on the cowling for tightening the cowling to the housing. The shroud is comprised of an annular array of longitudinally extending bristles. The cowling and the bristles are longitudinally adjustable with respect to the distal end of the housing. The space between the needles and the cowling and bristles defines a plenum chamber for enclosing debris generated by the reciprocation of the needles against a surface being treated. The vacuum conduit is arranged in fluid communication with the plenum chamber so as to permit any debris therein to be ducted away without contaminating the environment.

The invention also comprises a method of scaling a nonplanar surface of contaminated debris by a portable means, comprising: providing a needle scaling device having reciprocably empowered needles extending from a distal end thereof; arranging a cowling with a flexible shroud thereon, around the distal end of the housing and the needles extending therefrom; and loosening a tightenable adjustment and securement means on the cowling so as to permit the cowling and the flexible shroud to be longitudinally adjusted with respect to the distal end of the needles, permitting the needles to enter a work area smaller than the diameter of the cowling.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figures 1, 2:
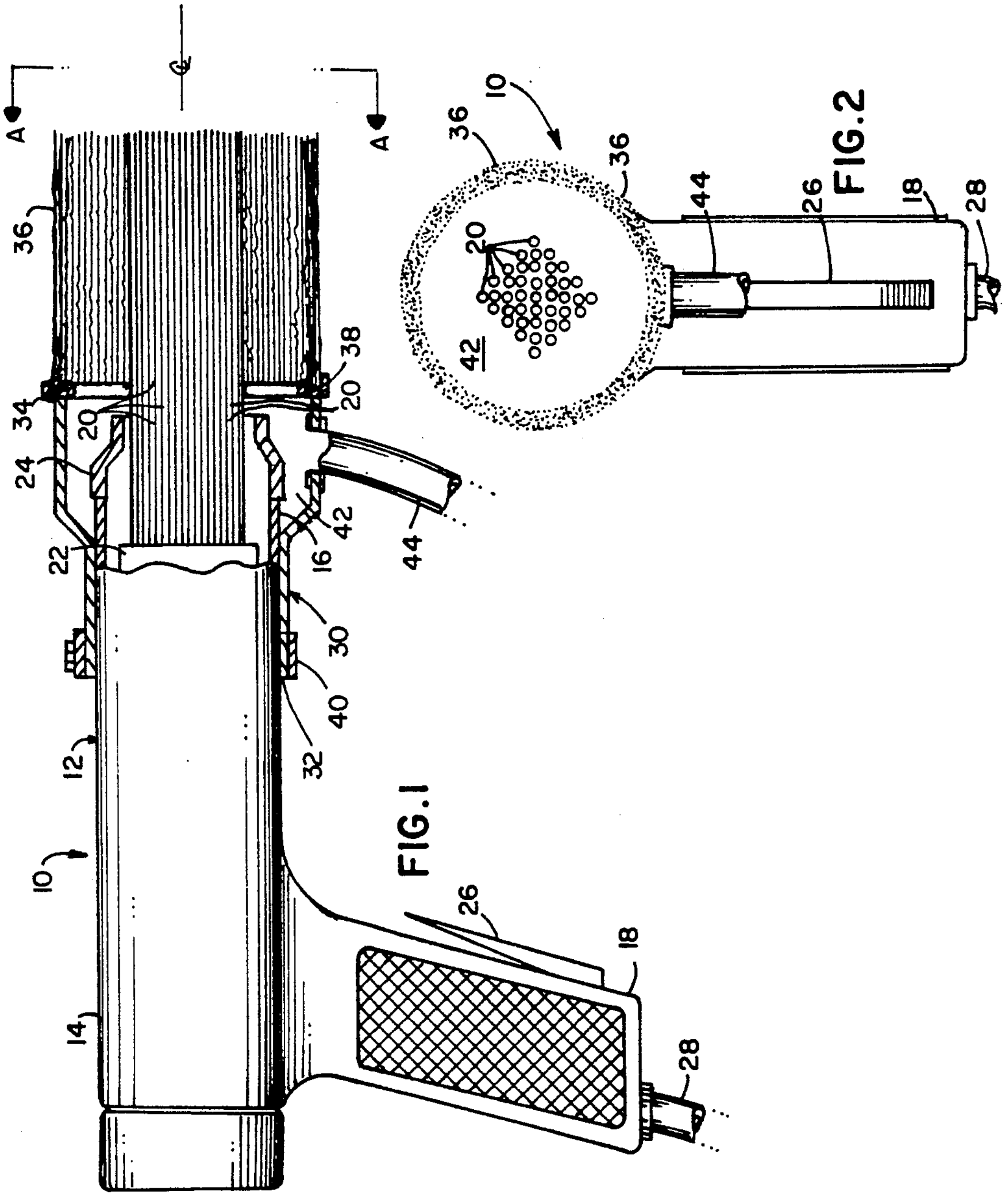
FIG. 1 is a side elevational view of a needle scaling device with portions shown in cross-section, the device constructed according to the principles of the present invention.
FIG. 2 shows a view taken along the lines A—A of FIG. 1.

Referring now to the drawings in detail, and particularly to FIG. 1, there is shown a needle scaling device 10. The needle scaling device 10 has an elongated barrel shaped main housing 12 having a proximal end 14 and a distal end 16. A grip handle 18 extends generally radially off of the side of the proximal end 14 of the main housing 12. The main housing 12 contains an actuation means, not shown for causing the movement of the scaling means, which are a plurality of elongated, thin, steel needles 20 attached to a block 22. The needles 20 and block 22 are reciprocably motivated by the actuation means in a known manner within the main housing 12. The needles 20 extend out beyond an annular lip 24 disposed on the distal end of the main housing 12.

A trigger 26 is arranged in the grip handle 18. An energy conduit 28, for the transmission of pressurized air, is arranged through the grip handle 18, to power the actuation means, typical in a needle scaling device 10.

A tubular cowling 30 is adapted about the distal end 16 of the main housing 12. The tubular cowling 30 has a proximal end 32 which has an inner diameter which is only slightly larger than the outer diameter of the main housing 12. The cowling 30 has a stepped increase in its diameter, as shown in FIG. 1, which larger diameter extends to the distalmost end 34 thereof.

An annular array of bristles 36 is secured in a channel clip 38. The clip 38 is replacably secured to the distalmost end 34 of the cowling 30. The bristles 36 are in coaxial alignment with the centerline of the main housing 12 and with the needles 20. A threadably adjustable tightening strap 40 is arranged on the outside of the proximal end 32 of the cowling 30. The cowling 30 is adapted to be slidably arranged on the main housing 12, to permit the bristles 36 to be moved along a longitudinal axis, with respect to the extendedmost position of the needles 20.

A plenum 42 defines the annular space between the outer side of the collection of needles 20 and the inside of the cowling 30 and bristles 36, along its larger diameter portion, as shown in FIGS. 1 and 2. A vacuum conduit 44 is disposed through the wall of the cowling 30, as shown in FIG. 1, and is attached to a vacuum source, not shown. The plenum 42 also includes the annular space between the collection of needles 20 and the bristles 36.

The threadable adjustable tightening strap 40, or similar tightening means, may be loosened, so as to permit the cowling 30 to be moved longitudinally to bring the distal end of the bristles 36 into axial alignment with the distal end of the needles 20, or to slide the cowling 30 and the plenum 42 therewith, proximally, to expose the needles 20, as necessary, for choping/scaling surfaces in tight locations.

In operation of the needle scaling device 10, a power source (electricity or pressurized air), energizes the needle scaling device 10 to reciprocably move the needles 20. The needles 20 may then be directed against a surface which needs to be scaled or cleaned/chipped of an undesired coat, such as lead paint or the like. The vacuum source is energized, to create a vacuum in the plenum chamber 42. This helps suck any hazardous scaled paint or the like from the atmosphere. The bristles 36 provide a flexible shroud around the distal tips of the reciprocably moving needles 20 when they strike and chip away at a surface being treated. The bristles 36, being of flexible nylon, horse hair or other thin resilient material, bend, so as to accommodate a nonperpendicular angle of attack of the needles 20 on the surface.

The tightening means 40, may be adjusted, so as to slide the cowling 30 and hence the bristles 36 distally or proximally, with respect to the distal end of the needles 20, thus permitting the needle scaling device 10 to be utilized in narrow corners or crowded areas where the full diameter of the cowling 30 may not fit, or might otherwise be a hindrance.

Therefore, what is shown is a needle scaling device having a flexible array of bristles that act as a shroud to define a plenum chamber to contain contaminated residue removed by the needles. The vacuum source attached to the cowling ensures that the debris will be properly removed and the bristles provide containment, as much as reasonably possible, against the escape of contaminants scaled from the surface being treated.

We claim:

1. A portable needle scaling device adaptable to clean surface portions of contaminants on structures in difficult to reach places, while permitting enclosure of such contaminants away from the environment, comprising:

an elongated, tubularly shaped main housing having a proximal and a distal end;

a plurality of longitudinally directed needle members extending reciprocably out of the distal end of said main housing, an empowerment means actuatably arranged within said housing adapted to effectuate reciprocable motion of said needles with respect to said housing;

a power supply conduit in communication with said housing to provide a power to said empowerment means;

a trigger for actuating said empowerment means;

a flexible shroud adapted around the distal end of said main housing, to define a plenum chamber between said shroud and said needles; and a vacuum conduit in fluid communication with said plenum chamber to permit removal of debris entrained in said chamber when said needles energizedly act upon a surface being treated, to contain the debris generated by the needles and prevent them from escaping into the environment while permitting said needles to attack the surface from any convenient angle;

said flexible shroud having a cowling attached thereto, said cowing comprising a tubular member having a proximal end that is arranged in a close fitting arrangement about the distal end of said main housing;

said crowling having a distal end which is of a larger diameter than said proximal end of said cowling.

2. The portable needle scaling device as recited in claim 1, wherein said flexible shroud is attached to the distalmost end of said cowling.

3. The portable needle scaling device as recited in claim 2, wherein said flexible shroud comprises an annular array of flexible bristles.

4. The portable needle scaling device as recited in claim 3, wherein said flexible bristles are disposed in a co-axial manner with respect to said needles and said main housing.

5. The portable needle scaling device as recited in claim 3, wherein said cowling has a tightenable securement means arranged around its proximalmost end.

6. The portable needle scaling device as recited in claim 5, wherein said cowling is slidably movable along the distal end of said main housing, so as to permit said bristles to be moved with respect to the distal end of the needles.

7. A portable needle scaling device for the removal of contaminated surface material, comprising:

an elongated generally tubularly shaped main housing having an arrangement of reciprocably empowered needles extending from a distal end thereof;

an actuatable empowerment source for reciprocatably moving said needles;

a flexible shroud disposed about the distal end of said main housing and said needles, for enclosing and containing debris cleaned from a surface being treated by said needles;

a tapered cowling disposed about the distal end of said housing, said flexible shroud attached to the distal end of said cowling; and securement means on said cowling for tightening said cowling to said housing.

8. A The portable needle scaling device as recited in claim 7, wherein said shroud is comprised of an annular array of longitudinally extending bristles.

9. The portable needle scaling device as recited in claim 8, wherein said cowling and said bristles are longitudinally adjustable with respect to the distal end of said housing.

10. A portable needle scaling device as recited in claim 9, having a space between said needles and said cowling and bristles which defines a plenum chamber for enclosing debris generated by the reciprocation of said needles against a surface being treated.

11. A portable needle scaling device, as recited in claim 10, wherein a vacuum conduit is arranged in fluid communication with said plenum chamber so as to permit any debris therein to be ducted away without contaminating the environment.

12. A method of scaling a non-planar surface of contaminated debris by a portable means, comprising:

providing a needle scaling device having reciprocably empowered needles extending from a distal end thereof;

arranging a cowling with a flexible shroud thereon, around the distal end of said housing and said needles extending therefrom;

loosening a tightenable adjustment and securement means on said cowling so as to permit said cowling and said flexible shroud to be longitudinally adjusted with respect to the distal end of said needles, permitting said needles to enter a work area smaller than the diameter of said cowling;

tightening said loosened adjustment and securement means upon proper locationing of said cowling and shroud; and scaling a contaminated surface area.

13. The method of claim 12, wherein said shroud comprises an annular array of longitudinally directed bristles.

* * * * *